United States Patent
Salem et al.

(10) Patent No.: US 11,510,241 B2
(45) Date of Patent: Nov. 22, 2022

(54) NETWORK-ASSISTED CLEAR CHANNEL ASSESSMENT BANDWIDTH ADAPTATION MECHANISM

(71) Applicant: Huawei Technologies Co., Ltd., Shenzhen (CN)

(72) Inventors: Mohamed Adel Salem, Kanata (CA); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 491 days.

(21) Appl. No.: 16/539,822

(22) Filed: Aug. 13, 2019

(65) Prior Publication Data

US 2020/0059964 A1 Feb. 20, 2020

Related U.S. Application Data

(60) Provisional application No. 62/719,539, filed on Aug. 17, 2018.

(51) Int. Cl.
*H04W 74/08* (2009.01)
*H04W 72/14* (2009.01)
*H04W 72/04* (2009.01)
*H04W 16/14* (2009.01)

(52) U.S. Cl.
CPC ....... *H04W 74/0808* (2013.01); *H04W 16/14* (2013.01); *H04W 72/042* (2013.01); *H04W 72/14* (2013.01)

(58) Field of Classification Search
CPC ............. H04W 74/0808; H04W 16/14; H04W 72/042; H04W 72/14; H04W 74/006
See application file for complete search history.

(56) References Cited

U.S. PATENT DOCUMENTS

| 10,178,698 | B2  |   | 1/2019 | Zhang et al. |              |
|------------|-----|---|--------|--------------|--------------|
| 10,264,538 | B2  | * | 4/2019 | Li           | H04W 72/0446 |
| 10,383,007 | B2  | * | 8/2019 | Ahn          | H04W 76/10   |
| 10,412,759 | B2  | * | 9/2019 | Ahn          | H04W 72/14   |
| 10,575,329 | B2  | * | 2/2020 | Salem        | H04W 74/0816 |

(Continued)

FOREIGN PATENT DOCUMENTS

| CN | 106538017 A | 3/2017  |
|----|-------------|---------|
| CN | 107439046 A | 12/2017 |

(Continued)

OTHER PUBLICATIONS

3GPP TS 37.213 V15.0.0 (Jun. 2018), 3rd Generation Partnership Project; Technical Specification Group Radio Access Network; Physical layer procedures for shared spectrum channel access (Release 15), 20 pages.

(Continued)

*Primary Examiner* — Mounir Moutaouakil
(74) *Attorney, Agent, or Firm* — Slater Matsil, LLP

(57) ABSTRACT

A method for channel assessment in unlicensed spectrum is provided, wherein the method includes receiving, by a device, a clear channel assessment (CCA) configuration indicating one or more channels of the unlicensed spectrum each with a respective CCA bandwidth. The method also includes performing, by the device, a CCA on at least one channel in the one or more channels of the unlicensed spectrum in accordance with the CCA configuration. A corresponding device is also provided.

32 Claims, 9 Drawing Sheets

(56) References Cited

U.S. PATENT DOCUMENTS

| | | | |
|---|---|---|---|
| 11,006,390 B2* | 5/2021 | Moon | H04W 74/0808 |
| 2015/0373652 A1 | 12/2015 | Dabeer et al. | |
| 2016/0021661 A1* | 1/2016 | Yerramalli | H04B 17/309 |
| | | | 370/329 |
| 2016/0066349 A1* | 3/2016 | Seok | H04W 74/0808 |
| | | | 370/338 |
| 2017/0288794 A1* | 10/2017 | Yerramalli | H04W 72/00 |
| 2018/0242362 A1* | 8/2018 | Kim | H04W 24/10 |
| 2019/0007972 A1* | 1/2019 | Gou | H04L 47/27 |
| 2019/0116614 A1* | 4/2019 | Li | H04W 72/0446 |
| 2019/0124689 A1* | 4/2019 | Yang | H04L 5/001 |
| 2019/0174501 A1* | 6/2019 | Yang | H04W 74/0808 |
| 2021/0315015 A1* | 10/2021 | Noh | H04L 27/2657 |

FOREIGN PATENT DOCUMENTS

| | | |
|---|---|---|
| EP | 3170358 A1 | 5/2017 |
| WO | 2016010684 A1 | 1/2016 |
| WO | 2016163854 A1 | 10/2016 |
| WO | 2017129751 A1 | 8/2017 |
| WO | 2018028716 A1 | 2/2018 |

OTHER PUBLICATIONS

3GPP TS 38.214 V15.2.0 (Jun. 2018), 3rd Generation Partnership Project; Technical Specification Group Radio Access Network; NR; Physical layer procedures for data (Release 15), 94 pages.

3GPP TS 38.321 V15.2.0 (Jun. 2018), 3rd Generation Partnership Project; Technical Specification Group Radio Access Network; NR; Medium Access Control (MAC) protocol specification (Release 15), 73 pages.

3rd Generation Partnership Project; Technical Specification Group Radio Access Network; Physical Layer procedures for shared spectrum channel access (Release 15), 3GPP TS 37.213 V26.2.0, Mar. 2019, 20 Pages.

* cited by examiner

NETWORK-ASSISTED CLEAR CHANNEL ASSESSMENT BANDWIDTH ADAPTATION MECHANISM

CROSS REFERENCE

The present application claims priority to U.S. Provisional Patent Application Ser. No. 62/719,539, filed Aug. 17, 2018, entitled "Network-assisted Clear Channel Assessment Bandwidth Adaptation Mechanism", the contents of which are incorporated herein by reference in their entirety.

TECHNICAL FIELD

The present disclosure relates to wireless communications, and in particular embodiments, to systems and methods for performing a Clear Channel Assessment (CCA).

BACKGROUND

Unlicensed wireless protocols may attempt to access wireless channels without centralized coordination and planning, which may lead to collisions between different unlicensed transmissions. One technique for mitigating such collisions is referred to as Carrier-Sense Multiple Access/Collision Avoidance (CSMA/CA). CSMA/CA includes a medium sensing stage, also called Clear Channel Assessment (CCA), during which a device determines a CCA status of a shared channel before performing a transmission. Techniques for improving the efficiency and collision avoidance of a CCA in unlicensed spectrum are desired.

SUMMARY

Technical advantages are generally achieved by embodiments of this disclosure which describe a network-assisted clear channel assessment bandwidth adaptation mechanism.

According to one aspect of the present disclosure, a method for channel assessment in unlicensed spectrum includes: receiving, by a device, a clear channel assessment (CCA) configuration indicating one or more channels of the unlicensed spectrum each with a respective CCA bandwidth; and performing, by the device, a CCA on at least one channel in the one or more channels of the unlicensed spectrum in accordance with the CCA configuration.

Optionally, in any of the previous aspects, the method further includes determining, by the device, that at least one channel in the one or more channels has a CCA idle condition; and based thereon transmitting, by the device, a wireless transmission over a resource within the at least one channel having the CCA idle condition.

Optionally, in any of the previous aspects, determining that the at least one channel has the CCA idle condition comprises determining that a plurality of channels, in the one or more channels, have the CCA idle condition, and transmitting the wireless transmission over a resource within the at least one channel having the CCA idle condition comprises transmitting the wireless transmission over one or more resources in the plurality of channels.

Optionally, in any of the previous aspects, the plurality of channels having the CCA idle condition are contiguous in the frequency domain.

Optionally, in any of the previous aspects, the plurality of channels having the CCA idle condition are non-contiguous in the frequency domain.

Optionally, in any of the previous aspects, the CCA configuration is received via a grant message allocating the resource to the device for transmitting the wireless transmission.

Optionally, in any of the previous aspects, the CCA configuration is received via a higher layer signaling message.

Optionally, in any of the previous aspects, the higher layer signaling message comprises system information.

Optionally, in any of the previous aspects, the higher layer signaling comprises a radio resource configuration (RRC) message.

Optionally, in any of the previous aspects, the RRC message indicates a resource for a transmission with configured grant (TCG).

Optionally, in any of the previous aspects, the CCA configuration is included in a physical layer activation/deactivation signal for a transmission with configured grant (TCG).

Optionally, in any of the previous aspects, the CCA configuration is included in a dynamic feedback indication that carries hybrid automatic repeat request (HARQ) feedback information from a gNodeB (gNB).

Optionally, in any of the previous aspects, the CCA configuration is included in a trigger signal from a Next Generation Node B (gNB) for a transmission with configured grant (TCG).

Optionally, in any of the previous aspects, the CCA configuration is included in UE-specific downlink control information (DCI) or group-common (GC) DCI.

Optionally, in any of the previous aspects, the CCA configuration is encoded to a configured fixed length bitmap Optionally, in any of the previous aspects, the CCA configuration is encoded to a variable length bitmap.

According to one aspect of the present disclosure, a device for performing channel assessment in unlicensed spectrum includes: a non-transitory memory storage comprising instructions; and one or more processors in communication with the non-transitory memory storage, wherein the one or more processors execute the instructions to: receive a clear channel assessment (CCA) configuration indicating one or more channels of the unlicensed spectrum each with a respective CCA bandwidth; and perform a CCA on at least one channel in the one or more channels of the unlicensed spectrum in accordance with the CCA configuration.

Optionally, in any of the previous aspects, the one or more processors execute the instructions to: determine that at least one channel in the one or more channels has a CCA idle condition and based thereon transmit a wireless transmission over a resource within the at least one channel having the CCA idle condition.

Optionally, in any of the previous aspects, the one or more processors execute the instructions to determine that the at least one channel has the CCA idle condition by executing instructions to determine that a plurality of channels, in the one or more channels, have the CCA idle condition, and the one or more processors execute the instructions to transmit the wireless transmission over a resource within the at least one channel having the CCA idle condition by executing instructions to transmit the wireless transmission over one or more resources in the plurality of channels.

Optionally, in any of the previous aspects, the plurality of channels having the CCA idle condition are contiguous in the frequency domain.

Optionally, in any of the previous aspects, the plurality of channels having the CCA idle condition are non-contiguous in the frequency domain.

Optionally, in any of the previous aspects, the CCA configuration is received via a grant message allocating the resource to the device for transmitting the wireless transmission Optionally, in any of the previous aspects, the CCA configuration is received via a higher layer signaling message.

Optionally, in any of the previous aspects, the higher layer signaling message comprises system information.

Optionally, in any of the previous aspects, the higher layer signaling comprises a radio resource configuration (RRC) message.

Optionally, in any of the previous aspects, the RRC message indicates a resource for a transmission with configured grant (TCG).

Optionally, in any of the previous aspects, the CCA configuration is included in a physical layer activation/deactivation signal for a transmission with configured grant (TCG).

Optionally, in any of the previous aspects, the CCA configuration is included in a dynamic feedback indication that carries hybrid automatic repeat request (HARQ) feedback information from a gNodeB (gNB).

Optionally, in any of the previous aspects, the CCA configuration is included in a trigger signal from a Next Generation Node B (gNB) for a transmission with configured grant (TCG).

Optionally, in any of the previous aspects, the CCA configuration is included in UE-specific downlink control information (DCI) or group-common (GC) DCI.

Optionally, in any of the previous aspects, the CCA configuration is encoded to a configured fixed length bitmap.

Optionally, in any of the previous aspects, the CCA configuration is encoded to a variable length bitmap.

BRIEF DESCRIPTION OF THE DRAWINGS

For a more complete understanding of the present disclosure, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the example designs and implementations illustrated and described herein, but may be modified within the scope of the appended claims along with their full scope of equivalents.

When a device attempts to access a shared channel, the device may perform a clear channel assessment (CCA) to determine whether the shared channel is being accessed by another device prior to transmitting a signal over the shared channel. If the energy level of the shared channel is below a threshold, then the device determines that the shared channel is in a CCA idle condition, and transmits its signal over the channel. If the energy level of the shared channel is above a threshold, then the device determines that the channel is in a CCA busy condition, and waits for a back-off interval before re-attempting to access the shared channel.

Conventional CCA sensing schemes rely on static/pre-configured CCA bandwidths, which lack flexibility and resource utilization efficiency. Embodiments of this disclosure provide mechanisms for dynamically adjusting a CCA configuration. In one embodiment, instead of determining a CCA configuration solely based on a device's own knowledge, the device receives a CCA configuration from another device. The device senses a CCA idle condition on a resource in accordance with the received CCA configuration, and then transmits a wireless signal over the resource.

In another embodiment, a device receives a CCA configuration from another device. The device provides feedback for the received CCA configuration by performing medium access measurements in accordance with the received CCA configuration, and transmitting results of the medium access measurements to the other device. The device may then receive an updated CCA configuration from the other device.

Figure 1:
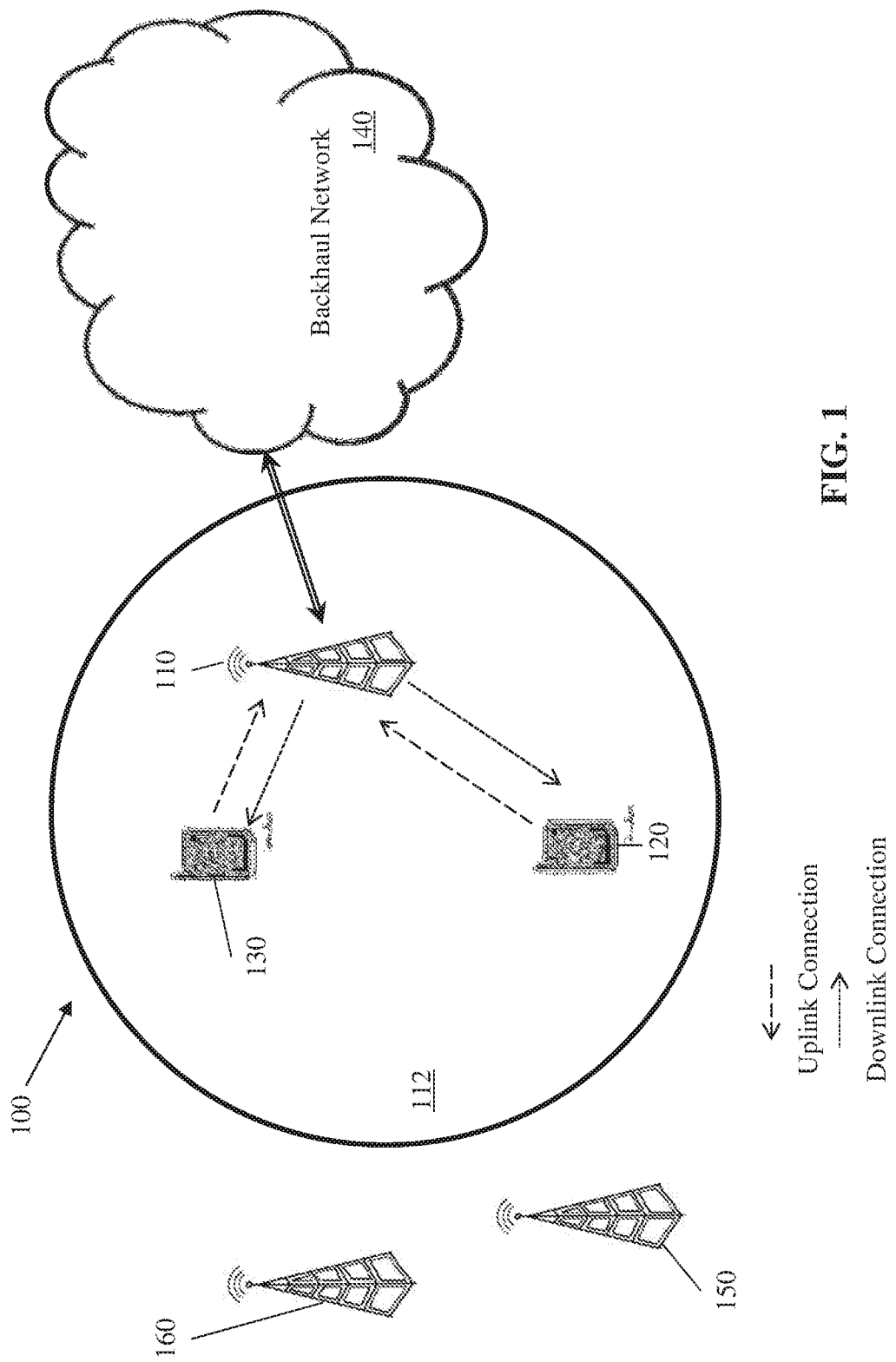
FIG. 1 illustrates an embodiment network architecture.

FIG. 1 illustrates a network 100 for communicating data and potential sources of interference. The network 100 comprises a base station 110 having a coverage area 112, a user equipment (UE) 120, a UE 130, and a backhaul network 140. As shown, the base station 110 establishes uplink (dashed line) and/or downlink (dotted line) connections with both the UE 120 and the UE 130, which serve to carry data from the UEs to the base station 110 and vice-versa. Data carried over the uplink/downlink connections may include data communicated between the UEs and the base station 110, as well as data communicated to/from a remote-end (not shown) by way of the backhaul network 140. A base station 150 and a base station 160 do not communicate directly with the UE 120, but base stations 150 and 160 both occupy the same shared channel as the network 100. The base station 150 uses a same wireless protocol as the network 100, and the base station 160 uses a different wireless protocol. The connections between the UE 120 and the base station 110 may experience interference from the UE 130, the base station 150 or the base station 160. As used herein, the term "base station" refers to any component (or collection of components) configured to provide wireless access to a network, such as a transmit receive point (TRP), an enhanced Node B (eNB), a next (fifth) generation (5G) NodeB (gNB), a macro-cell, a femtocell, a Wi-Fi access point (AP), or other wirelessly enabled devices. The base station 110 may provide wireless access in accordance with one or more wireless communication protocols, e.g., 5th generation new radio (5G NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

In general, a CCA configuration (or a CCA bandwidth configuration) identifies one or more channels over which a device may sense a CCA condition and transmit a signal. In particular, when the device attempts to access a shared channel of unlicensed spectrum, the device may determine a CCA condition (or a CCA status) of this shared channel by monitoring an energy level on the shared channel. When the energy level is below a threshold, the device may determine that the shared channel has a CCA idle condition, and transmit a signal over the shared channel. Otherwise, when the energy level exceeds the threshold, the device may determine that the shared channel is in a CCA busy condition, and wait for a back-off interval before re-attempting to access the shared channel.

Figure 2A:
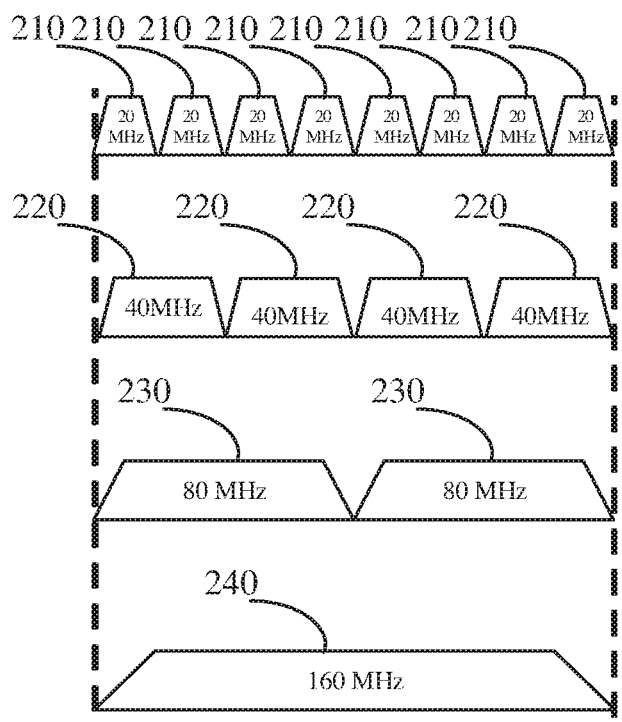
FIGS. 2A-B are various embodiment Clear Channel Assessment (CCA) configurations based on a set of pre-defined channels.
Figure 2B:
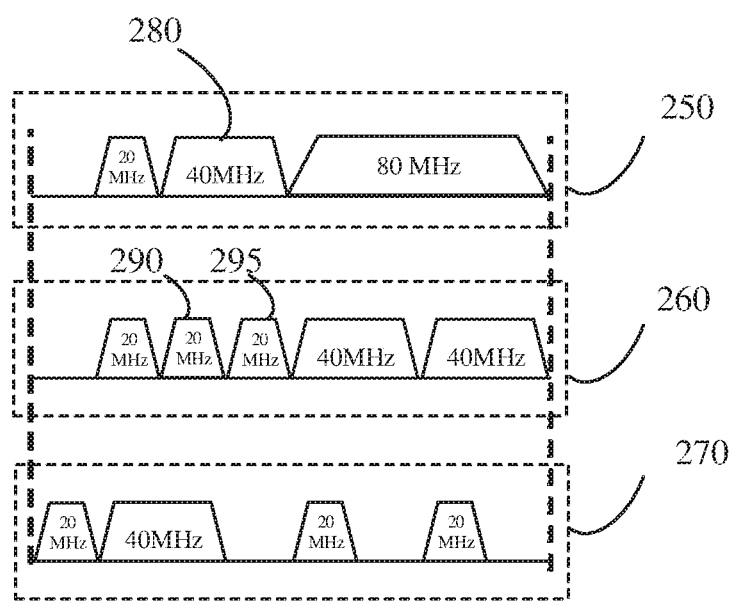

A channel in the CCA configuration may be selected from a set of predefined channels. For example, FIG. 2A illustrates that a 160 megahertz (MHz) frequency band 240 can be evenly divided into eight 20 MHz channels (sometimes also known as sub-bands) 210, four 40 MHz channels 220, or two 80 MHz channels 230. These channels (including frequency band 240) form a set of predefined channels for a CCA configuration. FIG. 2B is a diagram of CCA configurations for a 160 MHz channel. In this example, CCA configuration 250 includes a 20 MHz channel, a 40 MHz channel, and an 80 MHz channel. CCA configuration 260 includes three 20 MHz channels and two 40 MHz channels. CCA configuration 270 includes three 20 MHz channels and one 40 MHz channel. Although CCA configuration 250 and CCA configuration 260 occupy the same frequency range, they may still be treated as two different configurations because channel 280 in CCA configuration 250 is divided into two channels 290 and 295 in CCA configuration 260. It should be appreciated that a CCA configuration may include channels that are non-contiguous in the frequency domain such that at least two channels are separated by a gap (e.g., configuration 270).

Various types of uplink (UL) transmissions may be adopted in 5G New Radio-based access to unlicensed spectrum (NR-U). An uplink transmission may be grant-based (GB). For grant-based uplink transmissions, a base station may allocate a resource for the uplink transmission, and transmit an UL grant to the UE indicating the allocated resource. The UL grant is often included in downlink control information (DCI) carried by a Physical Downlink Control Channel (PDCCH). Motivated by stringent latency requirements of some traffic applications (e.g., ultra-reliable low latency communication (URLLC)), NR may use a technique named transmission with configured grant (TCG) which generally takes two forms—Type 1 TCG and Type 2 TCG. In NR-U, TCG in the unlicensed spectrum may be based on either type. In Type 1 TCG, a transmission on a Physical Uplink Shared Channel (PUSCH) may be communicated over resources configured by a UE-specific Radio Resource Control (RRC) configuration. In Type 2 TCG, PUSCH transmission may further depend on configuration parameters carried in a UE-specific layer 1 (L1) activation/de-activation signal. In both Type 1 TCG and Type 2 TCG, an UL transmission on configured resources may be either started by a UE autonomously, or triggered by an L1 signal from a gNB.

Figure 3:
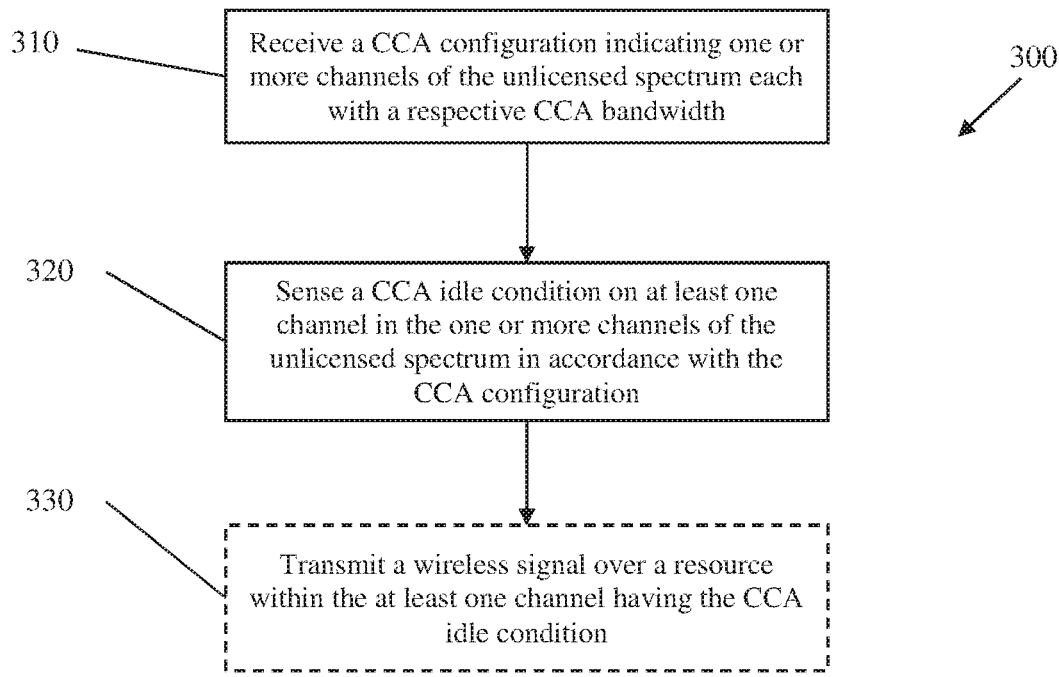
FIG. 3 is a flowchart of an embodiment method for performing a CCA.

FIG. 3 is a flowchart of an embodiment method 300 for sensing a CCA condition in unlicensed spectrum, as may be performed by a device, e.g., a UE, etc. At step 310, the device receives a CCA configuration indicating one or more channels of the unlicensed spectrum. Each of the one or more channels of the unlicensed spectrum is associated with a respective CCA bandwidth. FIG. 2B illustrates some example channels in a CCA configurations that have various CCA bandwidths (e.g., 20 MHz, 40 MHz, 80 MHz, and 160 MHz). At step 320, the device senses a CCA idle condition on at least one channel in the one or more channels of the unlicensed spectrum in accordance with the CCA configuration.

Optionally, at step 330, the device transmits a wireless signal over a resource within the at least one channel having the CCA idle condition. The resource may be allocated to the device for the transmission of the wireless signal. The device may select the at least one channel from the one or more channels of the unlicensed spectrum, so that the resource is located within a frequency range occupied by the at least one channel. The device may select as few channels as possible to reduce CCA computation load by performing a minimum number of CCAs on the selected channels. In one embodiment, the device may be a UE and the resource may be allocated by a base station. In a grant based UL transmission, the base station may send an UL grant to the UE to configure or indicate the allocated resource. In TCG, the allocated resource may be indicated by a UE-specific RRC configuration and/or a UE-specific L1 activation/de-activation signal. The UL grant, the UE-specific RRC configuration, the UE-specific L1 activation/de-activation signal, and any other type of control information that may be used to indicate a resource allocated to the device are referred to as resource allocation information herein. Although in this disclosure some embodiments are described in the context of a UE obtaining uplink channel access, it should be appreciated that such embodiments are not so limited and are equally applicable to downlink channel access in a perspective of a base station, and vice versa.

In one embodiment, the resource allocation information and the CCA configuration are transmitted in separate messages from the base station to the UE. For example, in grant based UL transmissions, the resource allocation information may be included in an UL grant and the CCA configuration may be included in an RRC message. The CCA configuration is valid for a period of time known to both the UE and the base station. The RRC message may include a parameter or a timer value which specifies how long the CCA configuration will last. When the UE receives the UL grant that only includes an allocated resource without a CCA configuration, the UE may apply the previously received CCA configuration (if that configuration is still valid), and perform a CCA for the allocated resource. In another example, the resource allocation information and the CCA configuration for a TCG may be included in two separate RRC messages.

In another embodiment, the resource allocation information and the CCA configuration are included in the same message. For example, a UE may receive an UL grant indicating both an allocated resource and a CCA configuration. The UE may use the allocated resource for an upcoming UL transmission, and apply the CCA configuration to the UL transmission. Alternatively, the UE may apply the CCA configuration to all subsequent UL transmissions. The UL grant may include a flag which indicates whether the CCA configuration in the UL grant applies to only the upcoming UL transmission, or it applies to all subsequent UL transmissions for a period of time or until another configuration is received. If the configuration applies to all subsequent UL transmissions, it may override a previously received CCA configuration. In another example, the resource allocation information and the CCA configuration for a TCG may be included in the same RRC message, or in the same L1 activation/de-activation signal. The RRC message or the L1 activation/de-activation signal may include a flag indicating that the CCA configuration in the RRC message or the L1 activation/de-activation signal overrides a previous CCA configuration.

In one embodiment, when the device receives different CCA configurations at different times, the device may determine which configuration should be applied. For example, a UE may have received a first CCA configuration included in an RRC message. Later when a TCG of the UE is triggered by an L1 signal from a gNB, the L1 signal may include a second CCA configuration different from the first CCA configuration. The UE may apply the second CCA configuration to only the triggered TCG, and still use the first CCA configuration after the triggered TCG is transmitted. Alternatively, if a timer is configured for the second CCA configuration, the UE may start the timer upon receiving the second CCA configuration, and apply the second CCA configuration to subsequent UL transmissions as long as the timer is still running. After the timer expires, the UE may switch back to the first CCA configuration.

In one embodiment, a flag may accompany a CCA configuration and indicate that the CCA configuration should be treated as a default configuration a device may use unless the device is otherwise instructed.

Figure 4:
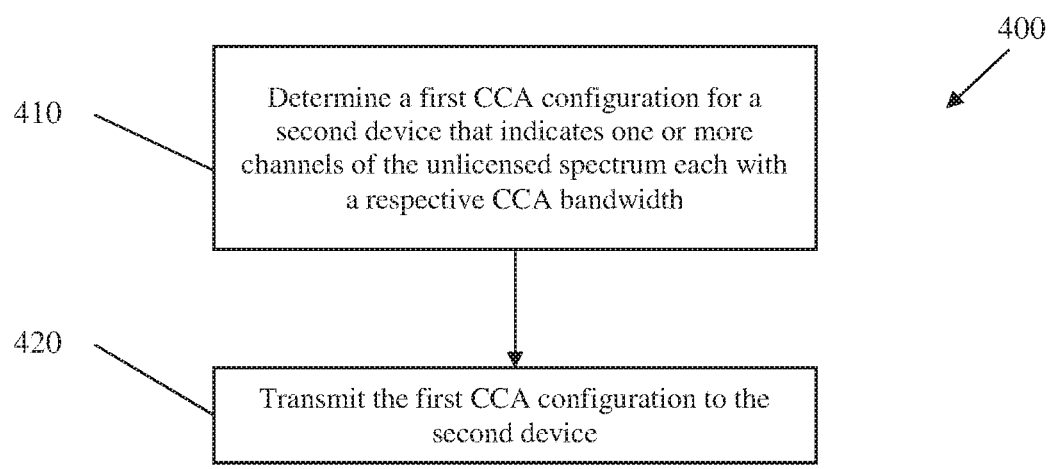
FIG. 4 is a flowchart of an embodiment method for determining and transmitting a CCA configuration.

FIG. 4 is a flowchart of an embodiment method 400 for determining and transmitting a CCA configuration. At step 410, a first device determines a CCA configuration for a second device. The CCA configuration indicates one or more channels of unlicensed spectrum, and each of the one or more channels of the unlicensed spectrum is associated with a respective CCA bandwidth. At step 420, the first device transmits the determined CCA configuration to the second device. In one embodiment, the first device may be a base station and the second device may be a UE. After the UE receives the CCA configuration, the UE may perform a CCA and transmit a wireless signal to the base station upon determining a CCA idle condition. In another embodiment, the UE may send a signal to another UE (e.g., in Device-to-Device (D2D) communication) instead of the base station upon determining a CCA idle condition.

In one embodiment, a CCA configuration may be included in a UE-specific DCI. In another embodiment, a CCA configuration may be included in a group common (GC) DCI. In such an embodiment, the GC DCI may be scrambled using a group-specific radio network temporary identifier (RNTI), and a group of UEs identified by the group-specific RNTI may apply the CCA configuration in the GC DCI.

Figure 5:
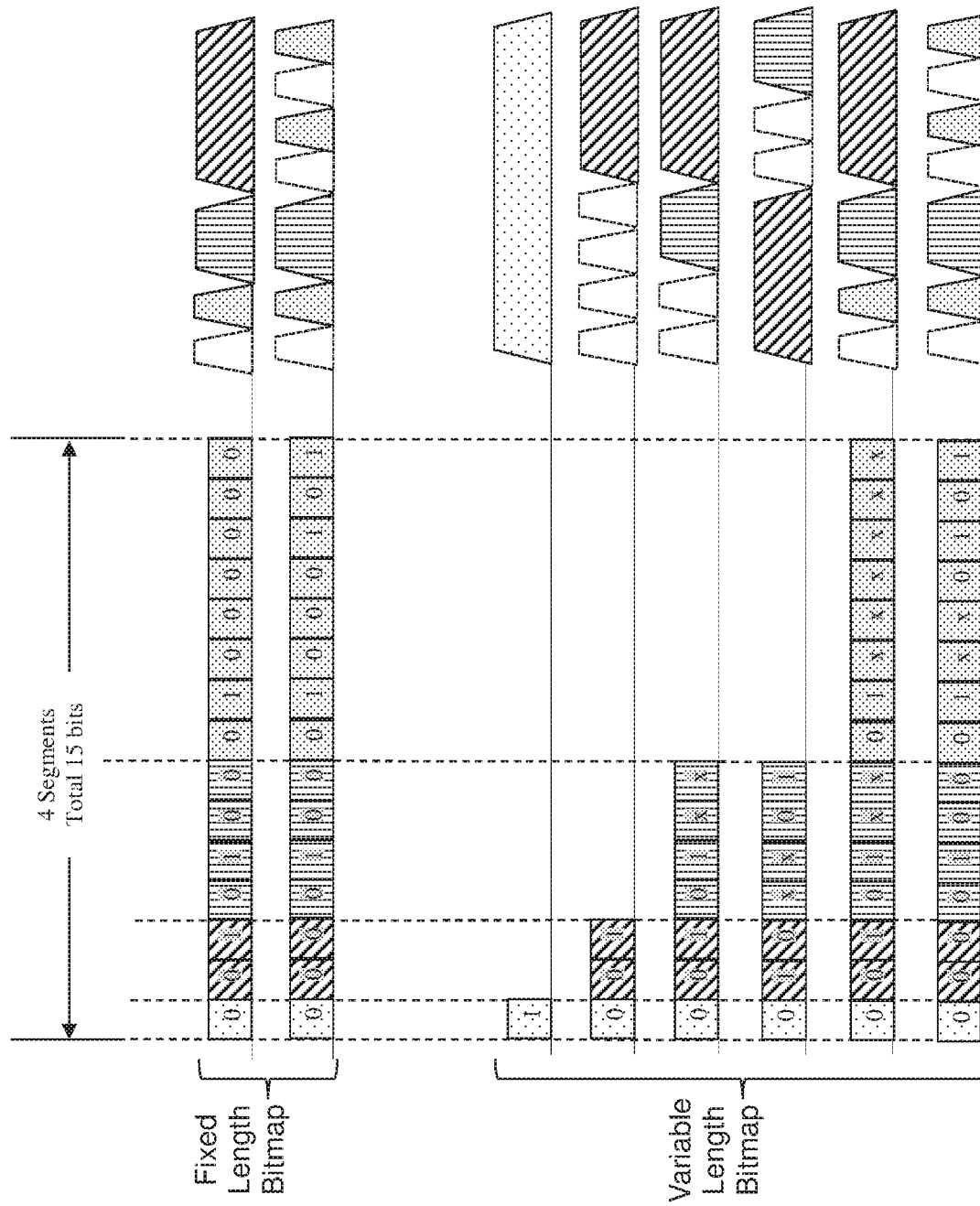
FIGS. 5A-B are embodiment methods for encoding a CCA configuration into a fixed length bitmap and a variable length bitmap.

A CCA configuration may be encoded into a bitmap of either a fixed length or a variable length. The bitmap may be compressed to reduce a signaling overhead. In one embodiment, a compact design of encoding a CCA configuration into a fixed length bitmap is given as below. A set of predefined channels may have n+1 types of bandwidths—$B_0, 2 \times B_0, \ldots, 2^n \times B_0$. The number of the first type of channels is $2^n$; the number of the second type of channels is $2^{n-1}$; ... the number of the n+1 th type of channels is one. A CCA configuration based on the above set of predefined channels may be represented as a bitmap of length $N = 2^{n+1} - 1$. The bitmap has n+1 segments. The i+1 th segments has $2^i$ bits, each of which corresponds to a channel of bandwidth $2^{n-i} \times B_0$ ($0 \le i \le n$). A bit with value "1" indicates that a predefined channel corresponding to the bit is included in the CCA configuration. FIG. 5A provides an example of the above encoding using the set of predefined channels provided in FIG. 2A. In another embodiment, a CCA configuration is encoded into a variable length bitmap by first encoding the CCA configuration into a fixed length bitmap, and then truncating redundant bits in the fixed length bitmap. FIG. 5B provides an example of encoding a CCA configuration into a variable length bitmap using the set of predefined channels provided in FIG. 2A. The "x" bits in FIG. 5B denote optional bits that are optionally not transmitted.

It should be understood from the preceding disclosure that the bitmap may be a field in the UE-specific or GC DCI as discussed earlier, and that the UE is typically informed of the field size through higher layer signaling, e.g., RRC.

Figure 6:
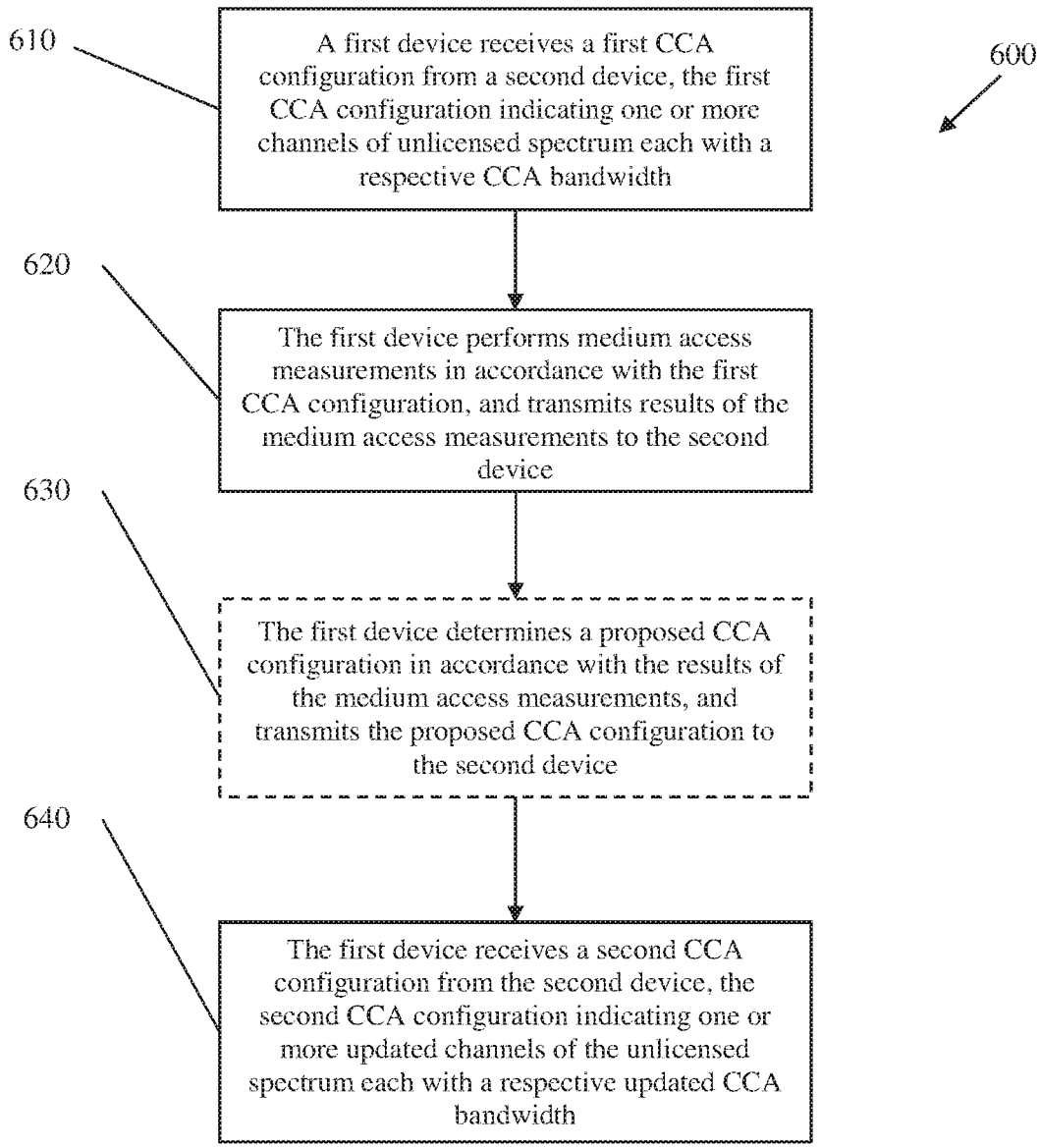
FIG. 6 is a flowchart of an embodiment method for providing feedback for a received CCA configuration.

FIG. 6 is a flowchart of an embodiment method 600 that instructs a device to provide feedback for a received CCA configuration. At step 610, a first device receives a first CCA configuration from a second device. The first CCA configuration indicates one or more channels of unlicensed spectrum, each with a respective CCA bandwidth. At step 620, the first device performs medium access measurements in accordance with the first CCA configuration, and transmits results of the medium access measurements to the second device. The first device may perform the medium access measurements periodically, and a periodic measurement may be scheduled through a higher layer signaling (e.g., an RRC message). At an optional step 630, after performing the medium access measurements, the first device may determine a proposed CCA configuration in accordance with results of the medium access measurements. The first device may transmit the proposed CCA configuration to the second device as feedback. At step 640, the first device receives a second CCA configuration from the second device. The second CCA configuration indicates one or more updated channels of the unlicensed spectrum each with a respective updated CCA bandwidth.

In one embodiment, the medium access measurements comprise a long-term average of energy detected on a channel in the first CCA configuration. In another embodiment, the medium access measurements comprise a medium access success rate on a channel in the first CCA configuration, e.g., a statistic of a rate of a CCA idle condition being detected on the channel during a specific period. In one example, only medium access success rates on channels with heavy traffic load are transmitted, to reduce the feedback overhead. In another embodiment, the medium access measurements comprise a medium access failure rate on a channel in the first CCA configuration, e.g., a statistic of a rate of a CCA busy condition being detected on the channel during a specific period. In one example, only medium access failure rates on channels with light traffic load are transmitted, to reduce the feedback overhead. In another embodiment, the medium access measurements comprise strength of an interference signal the first device receives from another device (e.g., a device in a co-existing system).

The first device may include the measured strength of the interference signal when the measured strength is above a threshold.

In one embodiment, the feedback for the first CCA configuration (e.g., the proposed CCA configuration and/or results of the medium access measurements) may be sent to the second device periodically following a preconfigured schedule. In another embodiment, the feedback may be sent to the second device when the results of the medium access measurements are different from those of a previous measurement. In another embodiment, the feedback may be sent to the second device on a poll-based schedule. For example, the first device may send the feedback to the second device upon receiving a request from the second device.

Figure 7:
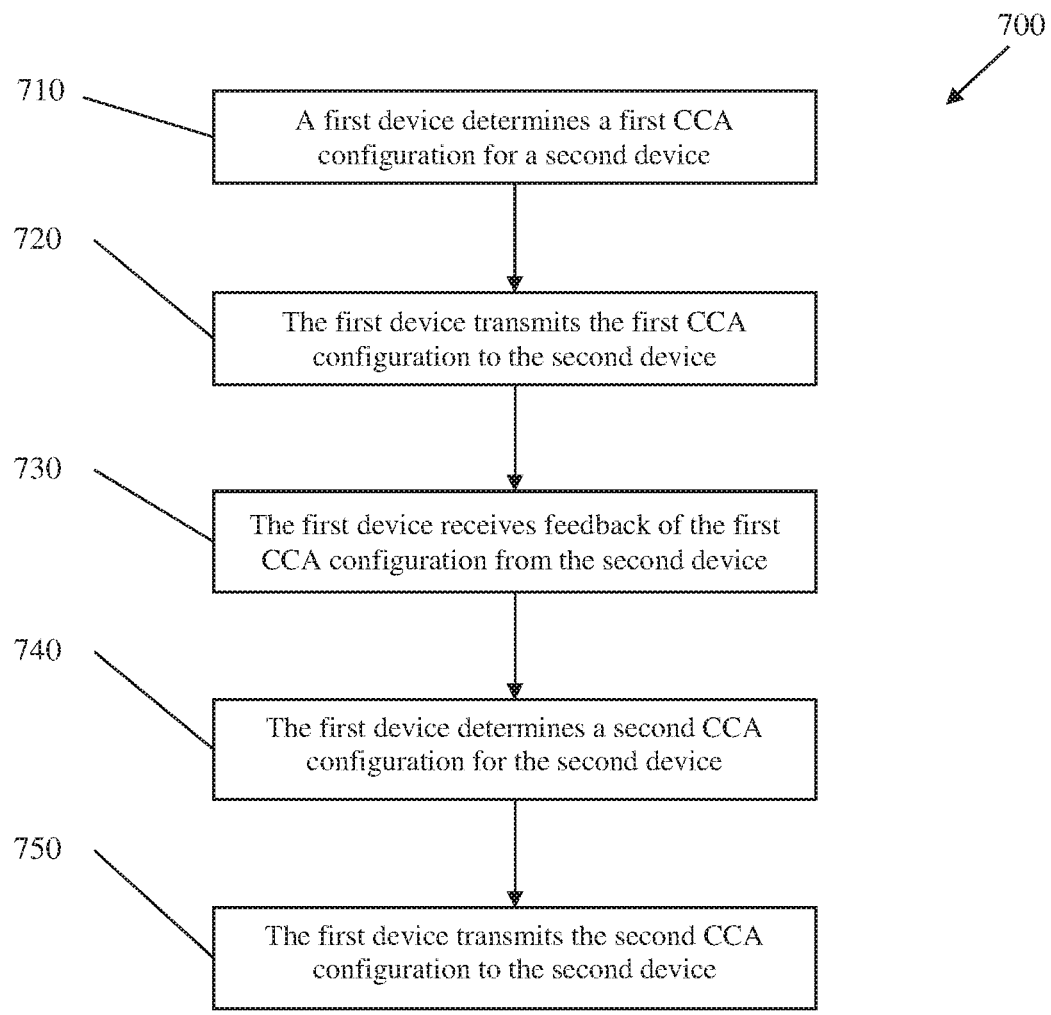
FIG. 7 is a flowchart of an embodiment method for determining a CCA configuration.

FIG. 7 is a flowchart of an embodiment method 700 for determining a new CCA configuration. At step 710, a first device determines a first CCA configuration for a second device. The first CCA configuration indicates one or more channels of unlicensed spectrum each with a respective CCA bandwidth. At step 720, the first device transmits the first CCA configuration to the second device. At step 730, the first device receives feedback of the first CCA configuration from the second device. At step 740, the first device determines a second CCA configuration for the second device. At step 750, the first device transmits the second CCA configuration to the second device.

At step 740, the second CCA configuration may be determined in accordance with the feedback of the first CCA configuration received from the second device. In one embodiment, the first device is a base station that manages a plurality of UEs including a first UE and other UEs, and the second device is the first UE. The feedback may comprise the results of the medium access measurements as discussed in step 620 of FIG. 6, or the proposed CCA configuration as discussed in step 630 of FIG. 6. Some of the other UEs may be located in the immediate vicinity of the first UE, and thus may provide similar feedback. Consequently, such UEs may be grouped together to receive the same CCA configuration. In another embodiment, the second CCA configuration may be the proposed CCA configuration the first device receives from the second device.

In another embodiment, instead of relying on the feedback from the second device, the first device may determine the second CCA configuration in accordance with results of measurements the first device has performed. The measurements the first device has performed may include a long-term sensing/decoding statistic of transmissions conducted by the second device. Such a statistic may be accumulated for each of the channels in the first CCA configuration. In one embodiment, the measurements may comprise side information about other intra-operator cells in proximity. In another embodiment, the measurements may comprise a long-term statistic of channel usage or bandwidths used for transmission. In another embodiment, the measurements may comprise a long-term statistic of CCA configuration that has been used by other intra-operator cells.

Figure 8:
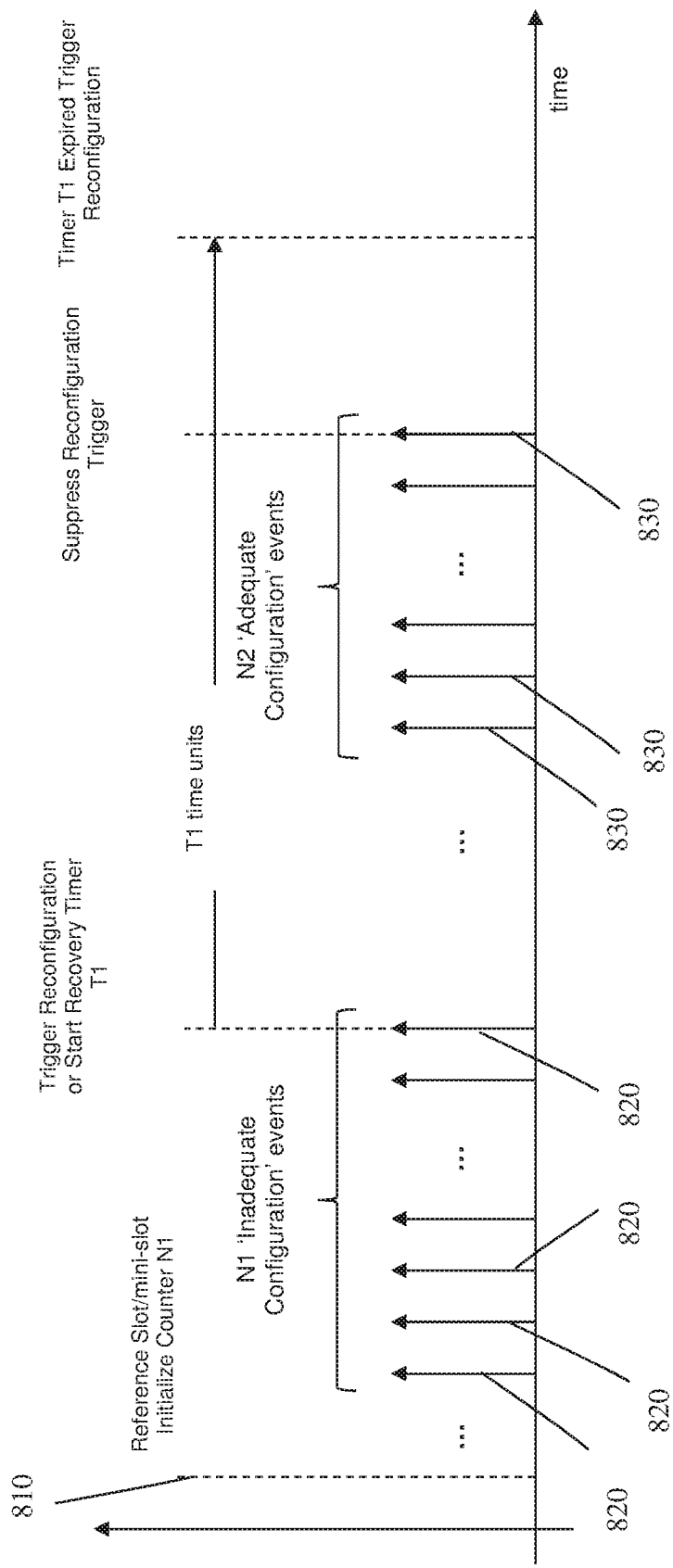
FIG. 8 is an embodiment method for triggering a reconfiguration condition.

The second CCA configuration may be determined when a reconfiguration condition is triggered. FIG. 8 is a diagram of an embodiment method for triggering a reconfiguration condition. In one embodiment, the first device is a base station and the second device is a UE. The base station may initialize a counter N1 at a reference slot or a reference mini-slot 810. For example, the reference slot/mini-slot 810 may be the time when a first transmission using the first CCA configuration is scheduled to be communicated on a Physical Uplink Control Channel (PUCCH) or a PUSCH. Each time an "outdated configuration" or "inadequate configuration" event 820 is detected, the base station increases N1. The reconfiguration condition is triggered when the counter N1 is equal to a threshold value M1. The base station may reset the counter N1 when an "adequate configuration" event 830 is detected before N1 reaches M1.

In another embodiment, the base station may start a recovery timer T1 upon detecting that the counter N1 is equal to M1. Then the base station may initialize a counter N2 and increase N2 each time an "adequate configuration" event 830 is detected. The base station may reset N2 if an "inadequate configuration" event 820 is detected before N2 reaches a threshold value M2. If the counter N2 reaches the threshold value M2 before the recovery timer T1 expires, the reconfiguration condition might not be triggered. Otherwise if the recovery timer T1 expires, the base station may trigger the reconfiguration condition.

An "adequate configuration" event may comprise a decoding success of a physical control channel (e.g., a PUCCH) by the second device, a decoding success of a physical shared channel (e.g., a PUSCH) by the second device; or a CCA idle condition determined by the first device. An "inadequate configuration" event may comprise a decoding failure of a physical control channel (e.g., a PUCCH) by the second device, a decoding failure of a physical shared channel (e.g., a PUSCH) by the second device; or a CCA busy condition determined by the first device.

Figure 9A:
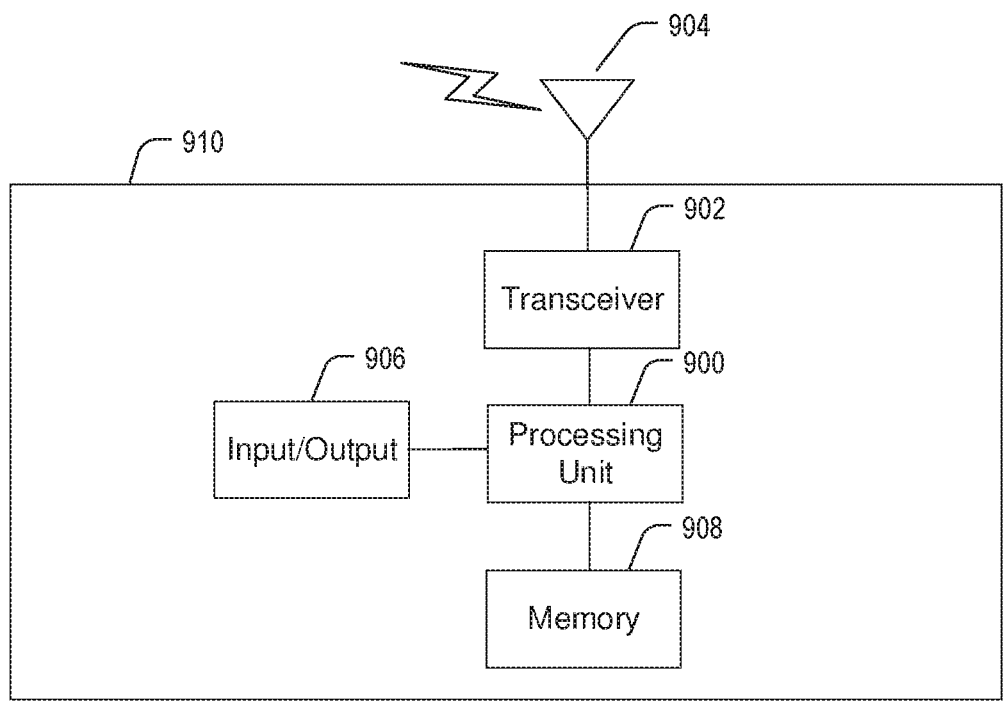
FIGS. 9A-B illustrate block diagrams of embodiment devices.
Figure 9B:
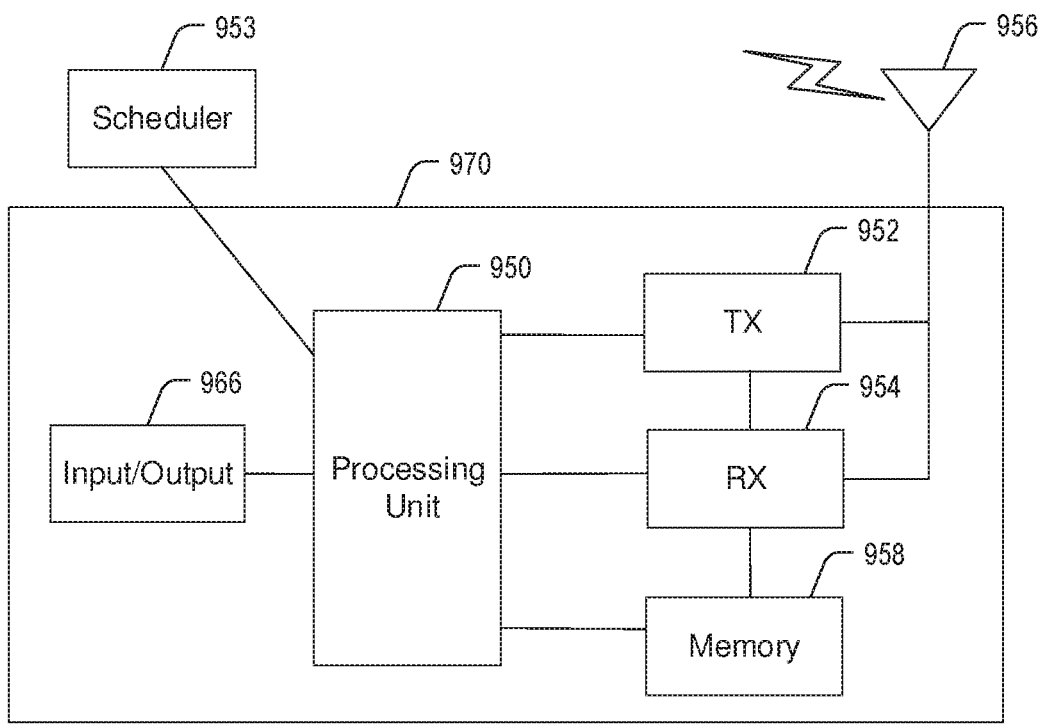

FIGS. 9A and 9B illustrate example devices that may implement the methods and teachings according to this disclosure. In particular, FIG. 9A illustrates an example UE 910, and FIG. 9B illustrates an example base station 970.

As shown in FIG. 9A, the UE 910 includes at least one processing unit 900. The processing unit 900 implements various processing operations of the UE 910. For example, the processing unit 900 could perform signal coding, data processing, power control, input/output processing, or any other functionality enabling the UE 910 to operate in the network. The processing unit 900 may also be configured to implement some or all of the functionality and/or embodiments described in more detail above. Each processing unit 900 includes any suitable processing or computing device configured to perform one or more operations. Each processing unit 900 could, for example, include a microprocessor, microcontroller, digital signal processor, field programmable gate array, or application specific integrated circuit.

The UE 910 also includes at least one transceiver 902. The transceiver 902 is configured to modulate data or other content for transmission by at least one antenna or Network Interface Controller (NIC) 904. The transceiver 902 is also configured to demodulate data or other content received by the at least one antenna 904. Each transceiver 902 includes any suitable structure for generating signals for wireless transmission and/or processing signals received. Each antenna 904 includes any suitable structure for transmitting and/or receiving wireless signals. One or multiple transceivers 902 could be used in the UE 910, and one or multiple antennas 904 could be used in the UE 910. Although shown as a single functional unit, a transceiver 902 could also be implemented using at least one transmitter and at least one separate receiver.

The UE 910 further includes one or more input/output devices 906 or interfaces. The input/output devices 906 permit interaction with a user or other devices in the network. Each input/output device 906 includes any suitable structure for providing information to or receiving information from a user, such as a speaker, microphone, keypad, keyboard, display, or touch screen, including network interface communications.

In addition, the UE 910 includes at least one memory 908. The memory 908 stores instructions and data used, generated, or collected by the UE 910. For example, the memory 908 could store software instructions or modules configured to implement some or all of the functionality and/or embodiments described above and that are executed by the processing unit(s) 900. Each memory 908 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. It is understood that the components as shown in FIG. 9A is for the purpose of illustration and the UE 910 may include part or all of the components illustrated in FIG. 9A.

As shown in FIG. 9B, the base station 970 includes at least one processing unit 950, at least one transmitter 952, at least one receiver 954, one or more antennas 956, at least one memory 958, and one or more input/output devices or interfaces 966. A transceiver, not shown, may be used instead of the transmitter 952 and receiver 954. A scheduler 953 may be coupled to the processing unit 950. The scheduler 953 may be included within or operated separately from the base station 970. The processing unit 950 implements various processing operations of the base station 970, such as signal coding, data processing, power control, input/output processing, or any other functionality. The processing unit 950 can also be configured to implement some or all of the functionality and/or embodiments described in more detail above. Each processing unit 950 includes any suitable processing or computing device configured to perform one or more operations. Each processing unit 950 could, for example, include a microprocessor, microcontroller, digital signal processor, field programmable gate array, or application specific integrated circuit. It is understood that the components as shown in FIG. 9B is for the purpose of illustration and the base station 970 may include part or all of the components illustrated in FIG. 9B.

Each transmitter 952 includes any suitable structure for generating signals for wireless transmission to one or more UEs or other devices. Each receiver 954 includes any suitable structure for processing signals received from one or more UEs or other devices. Although shown as separate components, at least one transmitter 952 and at least one receiver 954 could be combined into a transceiver. Each antenna 956 includes any suitable structure for transmitting and/or receiving wireless or wired signals. Although a common antenna 956 is shown here as being coupled to both the transmitter 952 and the receiver 954, one or more antennas 956 could be coupled to the transmitter(s) 952, and one or more separate antennas 956 could be coupled to the receiver(s) 954. Each memory 958 includes any suitable volatile and/or non-volatile storage and retrieval device(s) such as those described above in connection to the UE 910. The memory 958 stores instructions and data used, generated, or collected by the base station 970. For example, the memory 958 could store software instructions or modules configured to implement some or all of the functionality and/or embodiments described above and that are executed by the processing unit(s) 950.

Each input/output device 966 permits interaction with a user or other devices in the network. Each input/output device 966 includes any suitable structure for providing information to or receiving/providing information from a user, including network interface communications.

Figure 10:
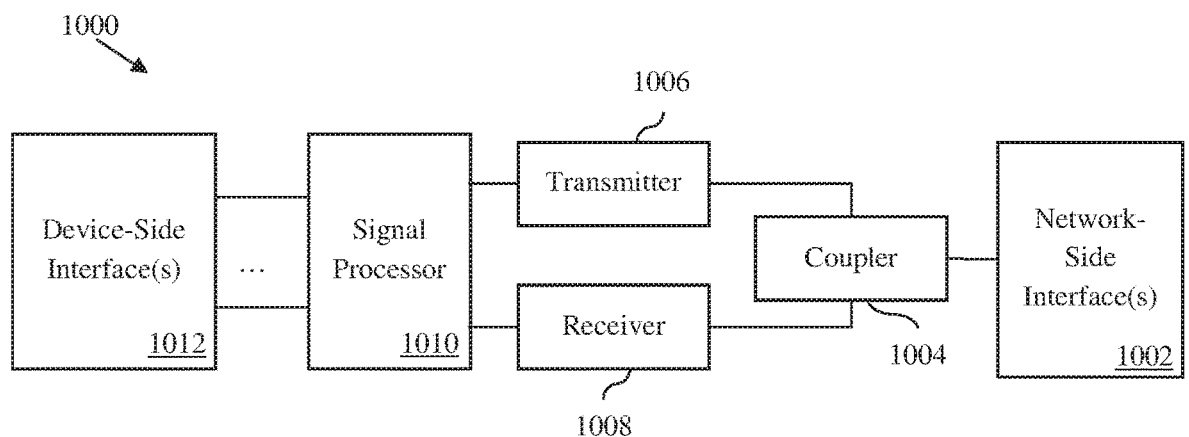
FIG. 10 illustrates a block diagram of an embodiment transceiver.

FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Example 1. A method for channel assessment in unlicensed spectrum, the method comprising: receiving, by a first device, a first clear channel assessment (CCA) configuration from a second device, the first CCA configuration indicating one or more channels of the unlicensed spectrum each with a respective CCA bandwidth; performing, by the first device, medium access measurements in accordance with the first CCA configuration, and transmitting results of the medium access measurements to the second device; and receiving, by the first device, a second CCA configuration from the second device, the second CCA configuration indicating one or more channels of the unlicensed spectrum each with a respective CCA bandwidth, the second CCA configuration being different from the first CCA configuration.

Example 2. The method of Example 1, wherein the medium access measurements comprise: a long-term average of energy detected based on the first CCA configuration; a medium access success rate; a medium access failure rate; or a received signal strength from a co-existing wireless node.

Example 3. The method of Example 1, further comprising: determining, by the first device, a third CCA configuration in accordance with the results of the medium access measurements; and transmitting the third CCA configuration to the second device.

Example 4. A method for channel assessment in unlicensed spectrum, the method comprising: determining, by a first device, a first clear channel assessment (CCA) configuration for a second device, the first CCA configuration indicating one or more channels of the unlicensed spectrum each with a respective CCA bandwidth; and transmitting, by the first device, the first CCA configuration to the second device.

Example 5. The method of Example 4, further comprising: receiving, by the first device, feedback of the first CCA configuration from the second device; determining, by the first device, a second CCA configuration for the second device; and transmitting, by the first device, the second CCA configuration to the second device.

Example 6. The method of Example 5, wherein the feedback comprises a measurement result and/or a third CCA configuration proposed by the second device.

Example 7. The method of Example 4, wherein the second CCA configuration is determined in accordance with the feedback.

Example 8. The method of Example 1, wherein the second CCA configuration is determined in accordance with a local statistic generated by the first device.

Example 9. The method of Example 1, wherein the second CCA configuration is determined upon detecting a threshold number of inadequate configuration events.

Example 10. The method of Example 5, wherein each of the threshold number of inadequate configuration events comprises: a decoding failure of a physical control channel by the second device; a decoding failure of a physical shared channel by the second device; or a CCA failure by the first device.

Example 11. The method of Example 1, wherein the second CCA configuration is transmitted upon detecting a first number of inadequate configuration events, and detecting less than a second number of adequate configuration events within a time period after detecting the first number of inadequate configuration events.

Example 12. The method of Example 11, wherein each of the second number of adequate configuration events comprises: a decoding success of a physical control channel by the second device; a decoding success of a physical shared channel by the second device; or a CCA success by the first device.

Example 13. A user equipment (UE) comprising: a non-transitory memory storage comprising instructions; and one or more processors in communication with the non-transitory memory storage, wherein the one or more processors execute the instructions to: receive a clear channel assessment (CCA) configuration indicating one or more channels of the unlicensed spectrum each with a respective CCA bandwidth; and sense a CCA idle condition on at least one channel in the one or more channels of the unlicensed spectrum in accordance with the CCA configuration.

Example 14. A network device comprising: a non-transitory memory storage comprising instructions; and one or more processors in communication with the non-transitory memory storage, wherein the one or more processors execute the instructions to: determine a first clear channel assessment (CCA) configuration for a user equipment (UE), the first CCA configuration indicating one or more channels of the unlicensed spectrum each with a respective CCA bandwidth; and transmit the first CCA configuration to the UE.

Although several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for channel assessment in unlicensed spectrum, the method comprising:
   receiving, by a first device from a second device, a first clear channel assessment (CCA) configuration indicating one or more first channels of the unlicensed spectrum each with a respective CCA bandwidth;
   performing, by the first device, a medium access measurement in accordance with the first CCA configuration to obtain a medium access measurement result;
   transmitting, by the first device to the second device, the medium access measurement result to the second device; and
   receiving, by the first device, a second CCA configuration from the second device, the second CCA configuration indicating one or more second channels of the unlicensed spectrum each with a respective CCA bandwidth, and the second CCA configuration being different from the first CCA configuration.

2. The method of claim 1, further comprising:
   determining, by the first device, that at least one channel has a CCA idle condition, the at least one channel being in the one or more first channels before receiving the second CCA configuration, or in the one or more second channels after receiving the second CCA configuration; and based thereon
   transmitting, by the first device, a wireless transmission over a resource within the at least one channel having the CCA idle condition.

3. The method of claim 2, wherein determining that the at least one channel has the CCA idle condition comprises determining that a plurality of channels, in the one or more first channels or the one or more second channels, have the CCA idle condition, and wherein transmitting the wireless transmission over the resource within the at least one channel having the CCA idle condition comprises transmitting the wireless transmission over one or more resources in the plurality of channels.

4. The method of claim 3, wherein the plurality of channels having the CCA idle condition are contiguous in the frequency domain.

5. The method of claim 3, wherein the plurality of channels having the CCA idle condition are non-contiguous in the frequency domain.

6. The method of claim 2, wherein at least one of the first CCA configuration and the second CCA configuration is received via a grant message allocating the resource to the first device for transmitting the wireless transmission.

7. The method of claim 1, wherein at least one of the first CCA configuration and the second CCA configuration is received via a higher layer signaling message.

8. The method of claim 7, wherein the higher layer signaling message comprises system information.

9. The method of claim 7, wherein the higher layer signaling comprises a radio resource configuration (RRC) message.

10. The method of claim 1, wherein the first CCA configuration is included in a physical layer activation/deactivation signal for a transmission with configured grant (TCG).

11. The method of claim 1, wherein the first CCA configuration is included in a dynamic feedback indication that carries hybrid automatic repeat request (HARQ) feedback information from a gNodeB (gNB).

12. The method of claim 1, wherein the first CCA configuration is included in a trigger signal from a Next Generation Node B (gNB) for a transmission with configured grant (TCG).

13. The method of claim 1, wherein the first CCA configuration is included in UE-specific downlink control information (DCI) or group-common (GC) DCI.

14. The method of claim 1, wherein the medium access measurement comprises a measurement of a medium access failure rate.

15. The method of claim 14, wherein the medium access failure rate is a rate of a CCA busy condition being detected during a specific period, and the second CCA configuration is determined by the second device in response to a threshold number of CCA busy conditions.

16. The method of claim 1, further comprising:
determining, by the first device, a third CCA configuration in accordance with the medium access measurement result; and
transmitting, by the first device, a transmission to the second device using the third CCA configuration.

17. A first device for performing channel assessment in unlicensed spectrum, the first device comprising:
a non-transitory memory storage comprising instructions; and
one or more processors in communication with the non-transitory memory storage, wherein the one or more processors execute the instructions to:
receive, from a second device, a first clear channel assessment (CCA) configuration indicating one or more first channels of the unlicensed spectrum each with a respective CCA bandwidth; and perform a medium access measurement in accordance with the first CCA configuration to obtain a medium access measurement result;
transmit the medium access measurement result to the second device; and
receive a second CCA configuration from the second device, the second CCA configuration indicating one or more second channels of the unlicensed spectrum each with a respective CCA bandwidth, and the second CCA configuration being different from the first CCA configuration.

18. The first device of claim 17, wherein the one or more processors execute the instructions to:
determine that at least one channel has a CCA idle condition and based thereon transmit a wireless transmission over a resource within the at least one channel having the CCA idle condition, the at least one channel being in the one or more first channels before receiving the second CCA configuration, or the one or more second channels after receiving the second CCA configuration.

19. The first device of claim 18, wherein the one or more processors execute the instructions to determine that the at least one channel has the CCA idle condition by executing instructions to determine that a plurality of channels, in the one or more first channels or the one or more second channels, have the CCA idle condition, and
wherein the one or more processors execute the instructions to transmit the wireless transmission over the resource within the at least one channel having the CCA idle condition by executing instructions to transmit the wireless transmission over one or more resources in the plurality of channels.

20. The first device of claim 19, wherein the plurality of channels having the CCA idle condition are contiguous in the frequency domain.

21. The first device of claim 19, wherein the plurality of channels having the CCA idle condition are non-contiguous in the frequency domain.

22. The first device of claim 18, wherein at least one of the first CCA configuration and the second CCA configuration is received via a grant message allocating the resource to the first device for transmitting the wireless transmission.

23. The first device of claim 17, wherein at least one of the first CCA configuration and the second CCA configuration is received via a higher layer signaling message.

24. The first device of claim 23, wherein the higher layer signaling message comprises system information.

25. The first device of claim 23, wherein the higher layer signaling message comprises a radio resource configuration (RRC) message.

26. The first device of claim 17, wherein the first CCA configuration is included in a physical layer activation/deactivation signal for a transmission with configured grant (TCG).

27. The first device of claim 17, wherein the first CCA configuration is included in a dynamic feedback indication that carries hybrid automatic repeat request (HARQ) feedback information from a gNodeB (gNB).

28. The first device of claim 17, wherein the first CCA configuration is included in a trigger signal from a Next Generation Node B (gNB) for a transmission with configured grant (TCG).

29. The first device of claim 17, wherein the first CCA configuration is included in UE-specific downlink control information (DCI) or group-common (GC) DCI.

30. The first device of claim 17, wherein the medium access measurement comprises a measurement of a medium access failure rate.

31. The first device of claim 30, wherein the medium access failure rate is a rate of a CCA busy condition being detected during a specific period, and the second CCA configuration is determined by the second device in response to a threshold number of CCA busy conditions.

32. The first device of claim 17, wherein the one or more processors execute the instructions further to:
   determine a third CCA configuration in accordance with the medium access measurement result; and
   transmit a transmission to the second device using the third CCA configuration.

* * * * *